Figure 1:
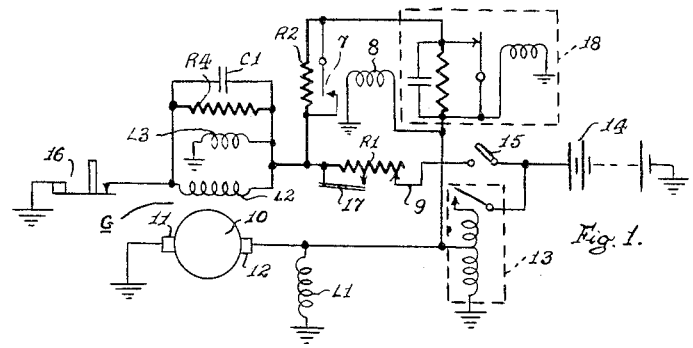

July 4, 1950   A. C. SAMPIETRO ET AL   2,513,521
CONTROL MEANS OF CLUTCHES

Filed Oct. 1, 1947   2 Sheets-Sheet 1

Achilles Charles Sampietro
Donald Russell Robertson
INVENTORS

By Richardson and David
their ATT'YS,

July 4, 1950  A. C. SAMPIETRO ET AL  2,513,521
CONTROL MEANS OF CLUTCHES

Filed Oct. 1, 1947  2 Sheets-Sheet 2

Achilles Charles Sampietro
Donald Russell Robertson
INVENTORS
By Richardson and David
their ATT'YS.

Patented July 4, 1950

2,513,521

UNITED STATES PATENT OFFICE 2,513,521

CONTROL MEANS OF CLUTCHES

Achilles Charles Sampietro and Donald Russell Robertson, London, England

Application October 1, 1947, Serial No. 777,336
In Great Britain September 30, 1946

Section 1, Public Law 690, August 8, 1946
Patent expires September 30, 1966

17 Claims. (Cl. 290—16)

This invention relates to control means of an electrically actuated slipable clutch, such as an electromagnetically-actuated friction clutch or an electromagnetically-energised eddy-current clutch, adapted to couple a variable-speed motor to a load required to be started and stopped while the motor is running.

Examples of clutches to which this invention is applicable are the friction clutches described in patent application of Achilles C. Sampietro, Serial Number 727,710, filed February 10, 1947, and the eddy-current clutches described in our patent application, Serial Number 751,290, filed May 29, 1947, which has now become abandoned.

The invention is primarily concerned with a clutch for connecting an internal-combustion motor to the transmission system of a vehicle; nevertheless it is applicable to clutches for other purposes.

The main object of this invention is to secure automatic engagement of the clutch in response to increase in speed of the motor.

Another object is to enable the characteristics of the automatic control system of the clutch to be readily adapted to the working conditions.

Another object is to provide a control system for an electrically-actuated slipable clutch of a motor vehicle, which system is suitable for use in combination with the kinds of electrical equipment of such vehicles at present in use.

Further objects and advantages of our invention will be apparent from the following description of various alternative embodiments thereof, given by way of example and with reference to the accompanying drawings. Figs. 1 to 4 of these drawings are respectively circuit diagrams of four control systems arranged in accordance with the invention and suitable for use on automobiles, and Fig. 5 is a diagram of an automobile chassis having a system according to the invention. Like parts in the several figures are denoted by the same reference characters.

In the figures, L1 denotes the energising winding serving when excited to cause engagement of the clutch C. Current is transmitted to the clutch through a brush Q and a slip ring R. A direct-current generator G, which is arranged to be driven by a belt transmission B at a speed proportional to the speed of the motor M, has an armature 10 and a field winding L2.

One terminal of the armature 10 is a brush 11 which is grounded and the other terminal is a brush 12 connected through a charging cut-out of usual type, enclosed in the dotted rectangle 13 in Figs. 1 to 5, to one terminal of an accumulator battery 14, the other terminal of which is grounded.

In Fig. 1 a first resistor R1 is connected in series with the generator field winding L2 between the live terminal of the battery 14 and ground. This field circuit includes a switch 15 which is next to the battery terminal and which is linked to a motor ignition switch S or otherwise so arranged that it is open whenever the motor is not required to run. The grounded end of this circuit contains a normally-closed switch 16 which may be operated by a push button P on the gear shift lever of the automobile change-speed transmission T and which is used to disengage the clutch C when required for gear-shifting while the vehicle is running. Resistor R4 and condenser C1 are shunted across the field winding L2 in order to absorb surges due to opening of the switch 16.

Half of the resistor R1 is adapted to be short-circuited by a thermally-actuated switch 17 arranged to operate in response to rise in motor temperature.

A second resistor R2 is connected between on the one side the junction of the field winding L2 and the first resistor R1 and on the other side the junction of the clutch energising winding L1 and the live brush 12 of the generator. The resistor R2 is in series with an automatic voltage regulator of usual type, contained in the dotted rectangle 18. A reversed field winding L3, providing only a small fraction of the ampere-turns provided by the main field winding L2, is connected in shunt across the main field winding and the control switch 16.

The generator operates partly as a separately-excited machine and partly as a shunt-connected machine. When the armature 10 is at rest and the switch 15 is closed, the battery 14 supplies the armature 10 in shunt with the clutch energising winding L1 through the two resistors R1 and R2 in series, and owing to the low resistance of the armature as compared with that of the clutch energising winding, the clutch remains disengaged. The main field winding L2 is mean-while energised through the first resistor R1 so that the generator excitation is low. If the motor is now accelerated, at first, owing to the low excitation of the generator, the back E. M. F. generated in the armature is so slight as to be ineffective. However, as the motor speed increases, this back E. M. F. becomes appreciable and the generator begins to operate as a shunt excited machine, the main field coil L2 being fed from the armature through the second resistor R2. Consequently the back E. M. F. across the armature rises steeply and, as it is applied directly to the clutch energising winding L1, the clutch is engaged progressively and without risk of stalling the motor.

The reversed field winding L3 operates, on disengagement of the clutch due to drop in speed of the motor, to reverse the polarity of the generator and provide a small output sufficient to compensate for the hysteresis in the iron of the clutch electro-magnet and thus ensure complete disengagement of the clutch.

In the example shown in Fig. 1 the first resistor R1 is variable automatically, in such a manner that its effective resistance value is decreased when the motor attains normal temperature so that, when the motor is cold, the clutch begins to engage at a higher motor speed than when the motor temperature is normal. Accordingly a thermally-actuated switch 17 is arranged to close in response to a rise in temperature of the motor manifolds. A hand control 9 may be provided, in addition to or instead of a thermostatic control for the resistor R1, in order to enable its value to be increased when desired, e. g. in starting a heavily loaded vehicle on a steeply rising gradient, or when reversing.

A relay, the exciting winding 8 of which is in shunt with the generator armature, may be so arranged that its front contact 7 short-circuits the second resistor R2 automatically as a result of rising of the armature voltage to say 80 or 90 per cent. of the normal battery voltage.

Suitable electrical values of the components are as follows:

Battery E. M. F._____volts__ 12
Resistance of L2_____ohms__ 4
Resistance of L3_____do____ 400
Resistance of R1_____do____ 30
Resistance of R2_____do____ 30
Resistance of L1_____do____ 5

Figure 2:
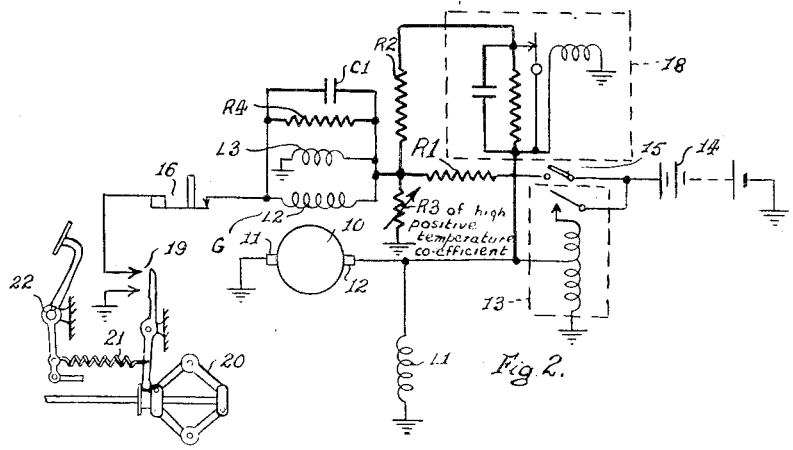

The system shown in Fig. 2 differs from that shown in Fig. 1 in the following respects. Firstly a third resistor R3 is connected in parallel with the generator field coils L2 and L3. By varying the value of the resistor R3, a system embodying a standard generator and a standard clutch may be readily adapted to provide a characteristic suitable for any particular combination of motor and load. If the resistor R3 is designed to attain a substantial temperature in normal operation and to have a high positive temperature coefficient of resistance it will compensate for the drop in generator field current that results from the generator's attaining its normal working temperature.

In place of or in series with a simple hand or foot-operated switch 16 in the main field circuit of the generator, there may be provided an automatic switch responsive to motor speed or to the setting of the power output control member of the motor or to both. Thus, in the example shown in Fig. 2, an automatic switch 19 is arranged to be actuated by a centrifugal governor 20 driven by the motor, the arrangement being such that the switch is open when the motor is idling, and the bias on the governor provided by a tension spring 21 is controlled by the motor accelerator shaft 22 in such a manner that operation of the accelerator in the sense required to accelerate the motor delays the closing of the switch 19.

Figure 3:
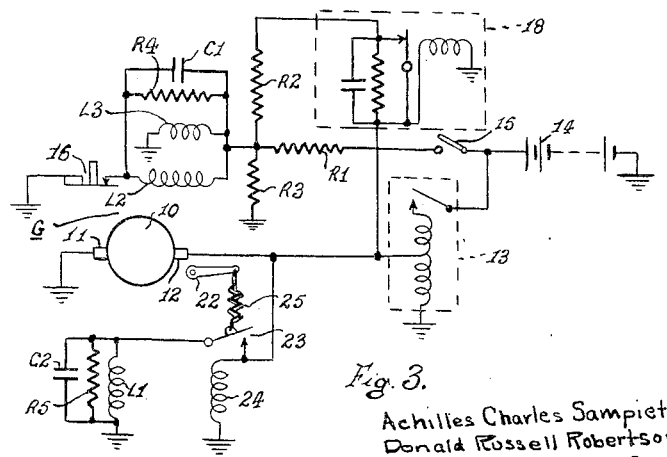

In the further modification shown in Fig. 3, the clutch energising coil L1, instead of being directly connected to the brush 12 of the generator, is fed through front contacts 23 of a relay which is biased towards the unoperated condition and the energising coil 24 of which is fed directly from the generator armature so that the relay operates in response to rise in motor speed. The bias on the relay is provided by a tension spring 25 and is varied in accordance with the setting of the accelerator shaft 22 of the motor in such a manner that the bias is increased with increase in the motor power output. During engagement of the clutch, the relay vibrates, feeding to the clutch energising coil a pulsating current, the mean value of which rises with increase in motor speed. A spark-suppressing circuit R5, C2 is shunted across the clutch coil L1.

Figure 4:
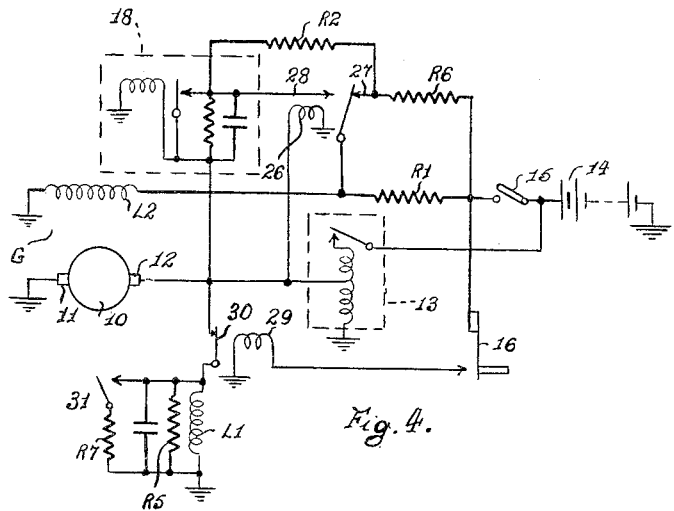
Figure 5:
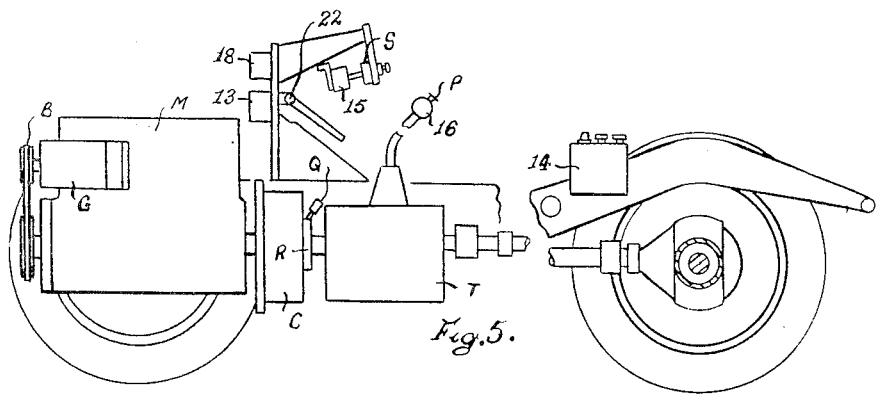

The circuit shown in Fig. 4 is designed to provide a rapid build-up of generator charging rate with increase in generator speed. A booster relay has an exciting winding 26 connected in shunt with the generator armature. The moving contact of this relay is connected to the junction of R1 and L2 and co-operates with a back contact 27 arranged to put a resistor R6 in shunt with the resistor R1. The automatic voltage regulator 18 is connected between the generator brush 12 and one terminal of the resistor R2, the other terminal of which is connected to the contact 27. The relay has also a front contact 28 connected to the junction of the regulator 18 and the resistor R2. The resistors R1, R2 and R6 may each have a resistance of 30 ohms.

The switch 16 for disengaging the clutch for gear shifting is biased to the open condition and when closed applies the battery voltage to the exciting winding 29 of a relay having a back contact 30 connecting the clutch winding L1 across the generator armature. A resistor R7 of 15 ohms is in series with a switch 31 across the winding L1 in addition to the resistor R5 and condenser C2 of 50 ohms and 8 microfarads respectively, the resistance of L1 being 5 ohms. The switch 31 may be closed, when the vehicle is required to be started with a cold motor, in order to cause the clutch to engage at a higher motor speed than normal.

When the motor is running slowly, the field winding L2 is supplied partly from the battery through the resistors R1 and R6 in shunt, and partly from the armature through the regulator 18 and the resistor R2. When the motor speed rises to a predetermined value, the moving contact of the booster relay disengages from the back contact 27 and engages the front contact 28 so that the generator field is excited mainly from the armature through the regulator 18.

When the invention is applied to the control of an eddy-current clutch, it may be desirable, in some circumstances, to select such electrical values of the components that the system becomes unstable, so that hunting occurs; this enables kinetic energy to be periodically stored in the rotating parts of the motor and withdrawn as impulses applied to the load, which may enable it to be started in difficult conditions which could not be overcome by steady application of the motor torque at the normal clutch-engaging speed.

We claim:

1. In combination with an electrically-actuated slipable clutch which has an energising winding serving when excited to cause engagement of the clutch and which is arranged to couple a variable-speed motor to a load requiring to be started and stopped while the motor is running, a control system for said clutch and including a direct-current electric generator which has an armature and a field winding, said armature being connected to supply said clutch energising winding, a source of current at substantially constant voltage, a first resistor connected in series with said field winding across said source, and a second resistor connected between on the one side the junction of said field winding and said first resistor and on the other side the junction of said clutch energising winding and one terminal of said armature and an electrical connection between the other terminal of said armature and the terminal of said field winding remote from said resistors.

2. The combination claimed in claim 1, wherein said current source is an accumulator battery, and said system includes a charging cut-out so connected that, on closing, it short-circuits said two resistors.

3. The combination claimed in claim 1, wherein said field winding is a main field winding and is in series with a clutch control switch, and said system includes a reversed field winding, providing only a small fraction of the ampere turns provided by said main field winding, and connected in shunt with said main field winding and said control switch.

4. The combination claimed in claim 1, wherein at least one of said resistors is variable.

5. The combination claimed in claim 1, wherein said first resistor is thermostatically controlled in response to motor temperature a rise in which reduces the resistance value.

6. The combination claimed in claim 1, wherein relay-operated switching means are associated with said second resistor and have an energising winding connected to receive the armature E. M. F. of said generator, a rise in which at least reduces the effective resistance value of said second resistor.

7. The combination claimed in claim 1, wherein a third resistor is connected in parallel with said field winding.

8. The combination claimed in claim 1, wherein said system includes a control member operable for varying the power output of said motor, a clutch control switch in at least one of the circuits including respectively said field winding and said exciting winding, means responsive to rise in speed of said motor for closing said switch automatically, and means operatively connected with said control member and said speed responsive means for causing the motor speed at which said switch closes to increase with displacement of said control member in the power-increasing sense.

9. The combination claimed in claim 1, wherein said system includes a relay having an exciting winding connected in shunt with said armature, said relay having front contacts controlling the circuit including said armature and said clutch energising winding.

10. The combination claimed in claim 1, wherein said system includes a control member operable for varying the power output of said motor, a relay having an exciting winding connected in shunt with said armature, said relay having front contacts controlling the circuit including said armature and said clutch energising winding, and means responsive to said control member for causing the exciting voltage at which said relay operates to rise with displacement of said control member in the power increasing sense.

11. The combination claimed in claim 1, including an additional resistor connected in series with said second resistor between said one armature terminal and the terminal of said source to which said first resistor is connected, said additional resistor being between said second resistor and said source terminal, a relay having an exciting winding connected in shunt with said armature, a back contact arranged to connect said first and additional resistors in shunt, and a front contact serving to connect the junction of said first resistor and said field winding to said armature terminal independently of said second resistor.

12. The combination claimed in claim 1, including a relay having a back contact for interrupting the connection between said armature and said clutch energising winding, and a switch biased to the open condition for connecting the exciting winding of said relay across said current source.

13. A land vehicle having an internal-combustion motor, an electrically-actuated slipable clutch having an energising winding and connecting said motor to a transmission system of the vehicle, a direct-current electric generator having a field winding and coupled to said motor so as to be driven at a speed proportional to the motor speed, an accumulator battery, a charging cut-out for electrically connecting said generator to said battery, means for electrically connecting said energising winding in shunt with said generator and independently of said cut-out, said field winding being in shunt with said battery and independent of said cutout.

14. A vehicle as claimed in claim 13, characterised in that a resistor is in series with said field winding.

15. A vehicle as claimed in claim 13, characterised in that a resistor is in series with said field winding, and wherein one terminal of said field winding is connected to one terminal of the generator armature, said vehicle being still further characterised in that a second resistor is connected between on the one hand the junction of the first said resistor and said field winding and on the other hand the junction of said energising winding and the other terminal of said armature.

16. A vehicle as claimed in claim 13, characterised in that a resistor is in series with said field winding, and wherein one terminal of said field winding is connected to one terminal of the generator armature, said vehicle being further characterised in that a second resistor is connected between on the one hand the junction of the first said resistor and said field winding and on the other hand the junction of said energising winding and the other terminal of said armature, said vehicle being still further characterised by a third resistor in shunt with said field winding.

17. A vehicle as claimed in claim 13, characterised in that a resistor is in series with said field winding, and wherein one terminal of said field winding is connected to one terminal of the generator armature, said vehicle being further characterised in that a second resistor is connected between on the one hand the junction of the first said resistor and said field winding and on the other hand the junction of said energising winding and the other terminal of said armature, said vehicle being still further characterised by a third resistor in shunt with said field winding, said third resistor having a positive temperature coefficient of resistance high enough to compensate for the drop in generator field current that results from the generator's attaining its normal working temperature.

ACHILLES CHARLES SAMPIETRO.
DONALD RUSSELL ROBERTSON.

REFERENCES CITED

The following references are of record in the file of this patent:

UNITED STATES PATENTS

| Number | Name | Date |
|---|---|---|
| 732,944 | Jenatzy, Fils | July 7, 1903 |
| 1,664,562 | Jensen | Apr. 3, 1928 |
| 1,817,660 | Winther et al. | Aug. 4, 1931 |
| 1,820,863 | Neuland | Aug. 25, 1931 |
| 1,963,642 | Beauchamp | June 19, 1934 |
| 2,278,507 | Beaudry | Apr. 7, 1942 |

FOREIGN PATENTS

| Number | Country | Date |
|---|---|---|
| 408,980 | Germany | Feb. 9, 1925 |